UNITED STATES PATENT OFFICE.

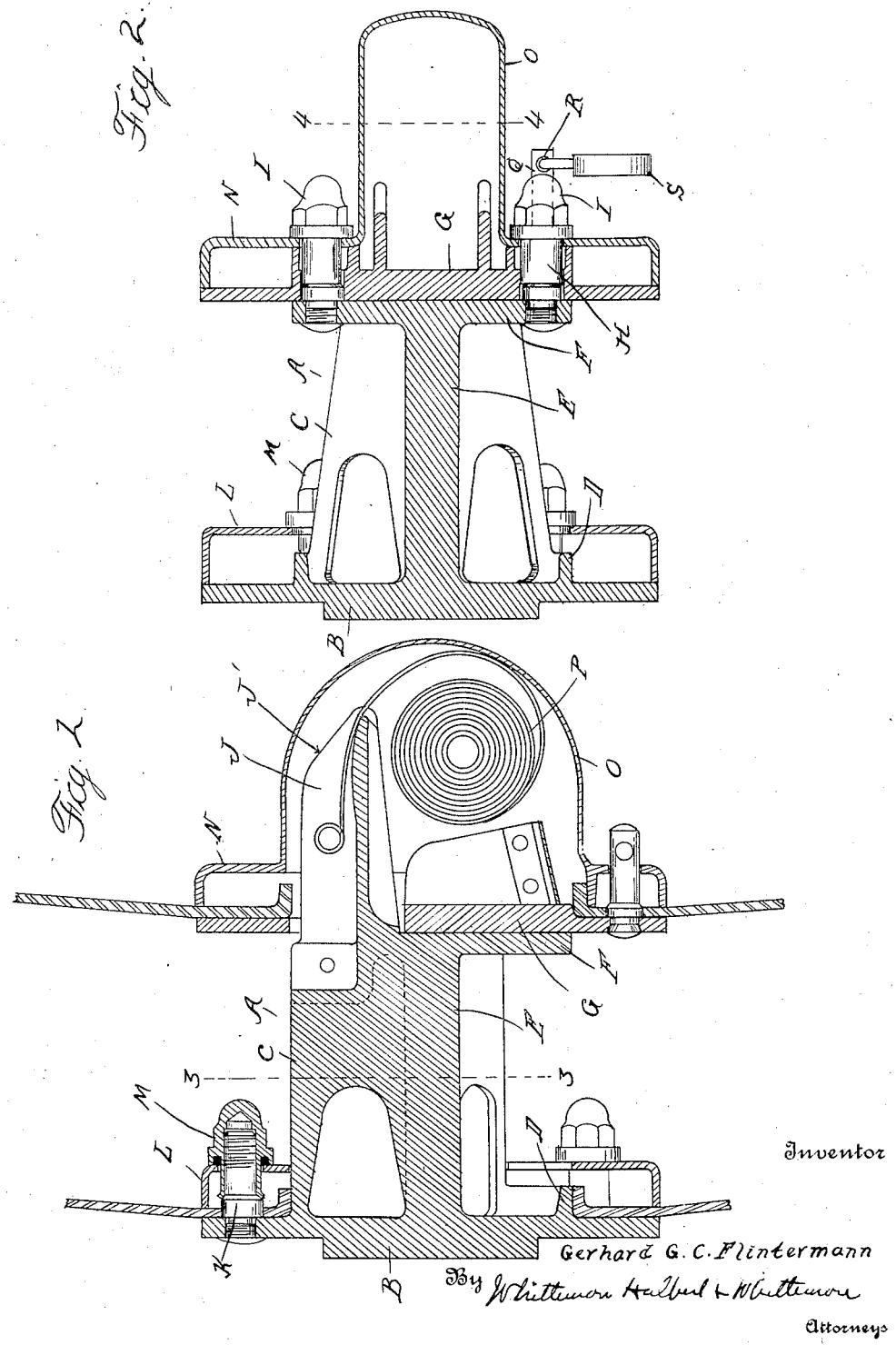

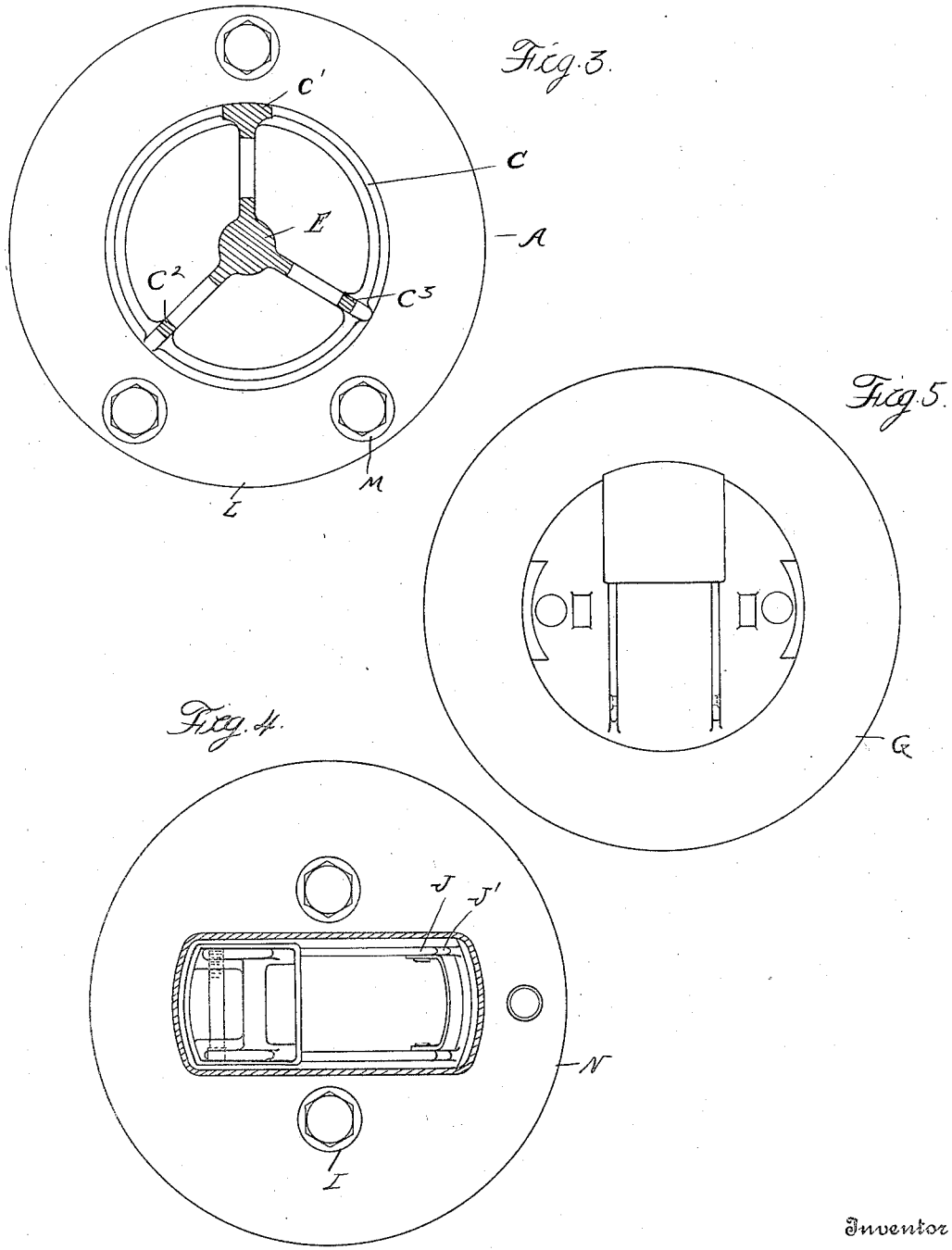

GERHARD G. C. FLINTERMANN, OF DETROIT, MICHIGAN, ASSIGNOR TO DETROIT PRESSED STEEL COMPANY, OF WILMINGTON, DELAWARE, A CORPORATION OF DELAWARE.

DEMOUNTABLE-WHEEL SUPPORT.

1,397,626.   Specification of Letters Patent.   Patented Nov. 22, 1921.

Application filed December 27, 1919. Serial No. 347,793.

*To all whom it may concern:*

Be it known that I, GERHARD G. C. FLINTERMANN, a citizen of the United States of America, residing at Detroit, in the county of Wayne and State of Michigan, have invented certain new and useful Improvements in Demountable-Wheel Supports, of which the following is a specification, reference being had therein to the accompanying drawings.

The invention relates to supports for spare wheels on motor vehicles, being more particularly designed for use in connection with demountable wheels of the disk type. It is the object of the invention to obtain a construction upon which the wheel may be easily placed and securely fastened; also one which permits of mounting a plurality of wheels thereon and with which the labor of lifting the wheel is materially reduced. With these objects in view the invention consists in the construction as hereinafter set forth.

In the drawings:

Figure 1 is a vertical longitudinal section through the wheel support, showing a plurality of disk wheels mounted thereon;

Fig. 2 is a horizontal section;

Fig. 3 is a cross-section on line 3—3 of Fig. 1;

Fig. 4 is a cross-section on line 4—4 of Fig. 2;

Fig. 5 is an elevation of the support for the second wheel detached.

With demountable wheels of the disk type above referred to, the disk bodies are separably attached to the wheel hubs and may be removed without disengagement of the rim or tires. When not in use, these wheels are mounted upon a carrier on the vehicle body, which frequently is at such a height that considerable labor is involved in the lifting and placing of the wheels thereon. With my improved construction the mounting for the wheel is of such a character that the disks may be easily engaged therewith and there is also provided means for assisting in the lifting of the disks and the guiding of the same onto the support.

In detail, A is a member, preferably formed of cast metal, having a base portion B which may be secured to any suitable part of the vehicle body, and an outwardly extending horn portion C forming a guide for receiving the disk. D is an annular flange on the base forming a bearing for the portion of the disk which normally bears upon the hub of the wheel and which is of a diameter corresponding substantially to the central aperture in the disk. The horn portion C is, however, of smaller diameter than this bearing D so that the disk may be readily moved thereover, and as shown the horn is formed by a central post E with a guide C' thereabove in the vertical plane thereof and auxiliary guides $C^2$ and $C^3$ angularly spaced from the guide C'. At the outer end of the post E is a circular plate F which is of a diameter less than that of the aperture in the disk, and this plate forms a seat for a second disk support G which is detachably secured thereto by studs H and clamping nuts I. The horn C has a portion J which extends beyond the plate F and is of a channel-shaped cross-section, the outer ends of the side flanges being inclined, as indicated at J', to facilitate guiding the disk thereon.

For securing the disk wheels in position there are provided studs K which register with the apertures in the disk for engaging the studs of the wheel hub. These studs are secured to the base B and are engaged by a clamping ring L and coöperating nuts M. The member G is provided with a clamping member N which is secured by the nuts I and studs H and this member N has a central housing portion O for embracing the outwardly projecting portion of the horn and a strap P attached thereto for use in lifting the wheel.

In use, when a wheel is to be mounted, the nuts I are disengaged and the members N and G are removed from the studs H. The nuts M are also disengaged and the member L removed. The operator can then slip the wheel over the horn and this operation is facilitated by the strap P, the outer end of which is threaded through the aperture in the disk and is then used for lifting the latter. After the disk is in engagement with the horn, it is moved inward against the bearing D and the clamping member L is engaged with the studs K and secured by the nuts M. If there is a second wheel to be mounted, the member G is first engaged with the studs H, after which the second disk is placed on the horn and is secured by the clamping member N and nuts I. To prevent unauthorized removal of the wheels any suitable locking device may be employed, such as an extension Q of one of the studs H, which is provided with a transverse aperture R for engagement of a padlock, such as S. When the padlock is engaged with a stud, removal of the member N is prevented and also the disengagement of the member G. Consequently, it is impossible to remove either of the wheels until the padlock is first disengaged.

What I claim as my invention is:

1. A demountable wheel support, comprising a base member provided with a seat for a disk wheel, a horn projecting from said base member as a guide for seating the disk, a seat member for another disk mounted on the outer portion of said horn, clamping means on each seat for securing a disk thereto and flexible guide means secured to the horn for lifting and directing disks on to the horn.

2. A demountable wheel support, comprising a base member provided near its inner end with a seat for a disk wheel, a horn carrying a second wheel seat in spaced relation to the first seat and forming an extension of the base member beyond the seats for guiding and directing disks to the seats, means on each seat for securing a disk thereto and flexible guide means secured to the base and adapted to lift and guide disks on the horn.

3. A demountable wheel support, comprising a base member provided with a pair of spaced disk seats connected by a horn that extends beyond the outer seat and forms a guide for directing applied disks to the respective seats, means for securing an applied disk to the inner seat, a flexible guiding member attached to the extremity of the horn for insertion through and guidance of an applied disk on to the horn and means for housing the flexible guide adapted to secure a disk on the outer seat.

4. A demountable wheel support, comprising a member provided with inner and outer disk wheel seats connected by a horn that supports the outer seat and extends beyond the latter as a guide for directing an applied disk to the seats, a flexible guide secured to the horn and adapted to direct a disk through which it is inserted on to the seats and means for locking the securing means.

5. A demountable wheel support, comprising a base member, a seat for a disk wheel thereon, a horn projecting outward from said base member forming a guide for the disk to its seat, a seat member for a second disk secured to the outer portion of said horn, clamping means for holding said disks to their respective seat members, a strap secured to said horn for assisting in lifting the disks thereon, and a housing for inclosing said strap member forming a portion of the clamping means for the outer disk.

6. A demountable wheel support, comprising a member provided with a plurality of disk wheel seats arranged in spaced relation with each other, means extending beyond the outermost seat to form a guide for directing applied disks to the respective seats, in combination with means for facilitating the mounting of the disks and means for securing the disks both separately and collectively.

In testimony whereof I affix my signature.

GERHARD G. C. FLINTERMANN.